United States Patent Office 3,287,316
Patented Nov. 22, 1966

3,287,316
PROCESS FOR THE PRODUCTION OF FILAMENTS OR FILMS BY SHAPING LINEAR POLYCARBONATES OF HIGH MOLECULAR WEIGHT
Béla von Falkai, Artur Prietzschk, Wolfgang Rellensmann, Alfred Reichle, and Horst Wieden, Dormagen, Germany, assignors to Farbenfabriken Bayer Aktiengesellschaft, Leverkusen, Germany, a German corporation
No Drawing. Filed Mar. 31, 1964, Ser. No. 356,053
Claims priority, application Germany, Apr. 11, 1963, F 39,471
5 Claims. (Cl. 260—47)

It is known to be possible to produce structures, which can be better crystallized, by adding non-solvents or poor solvents to solutions of high polymers which do not crystallize satisfactorily.

For example, it is possible, by adding carbon tetrachloride, benzene, methylpropyl ketone or di-n-butyl ether, to polycarbonate solutions to prepare foils of good crystallinity, and these foils, after stretching, have better technological properties than the non-crystalline material, whereas filaments spun from these solutions by the dry-spinning or wet-spinning processes only provide a small increase in the crystallinity under extreme spinning conditions. For example, at relatively low spinning tempeartures, a crystallization is certainly produced, but this is so irregular that the still soft, unfinished filaments likewise become very irregular when being drawn. These filaments are consequently unsuitable for a further processing.

In addition, whereas the added components in a quantity of an average 50 to 100%, based on the polycarbonate used, are sufficient for a good crystallization when producing foils, the aforementioned non-solvents only have a comparatively low efficacy when producing filaments, even when they are added in a high excess, i.e. far above 100% or almost up to the gelling limit.

This different behaviour of the solution during the processing in one case to form films and in another case to form filaments is based on the differential evaporation of the solvent, which proceeds very much more slowly when producing films than when forming filaments. A more complete crystallization of the polymer is therefore guaranteed, this being known to be dependent on time.

It has been found that alkyl, alkylene and/or aryl carbonates of the general formula

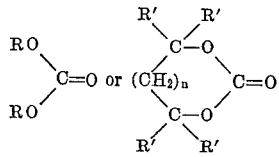

in which R represents alkyl, aryl or aralkyl, R' represents alkyl, aryl, aralkyl or hydrogen and $n=0$ to 6, as for example diethyl carbonate, propylene carbonate or diphenyl carbonate, are excellently suitable as additives for promoting crystallization, especially when added in a quantity up to 40%, based on the quantity by weight of the dissolved carbonate.

Accordingly, the subject of the present invention is a process for the production of filaments or films by shaping linear polycarbonates of high molecular weight from their solutions, and is characterized in that the polycarbonate solutions have added thereto, prior to the shaping, alkyl, alkylene or aryl carbonates of the aforementioned formula in a quantity up to 40%, based on the quantity of dissolved polycarbonate.

Films which are produced by casting from solutions with the said additives do not show a spherolithic structure in polarized light when examined under the light of a microscope, but merely double-refracting elements which cannot be recognized microscopically and which indicate a very fine microcrystalline morphology. In addition, the X-ray diagram and the density point to a well-crystallized structure of the unstretched foil.

Depending on the nature of the additive, good results are particularly found with additions of 20 to 40%, based on the quantity by weight of the polycarbonate, to a 13 to 25% solution, more especially 16.5 to 18.5%.

With the transferrence of these results to the production of fibers by the dry or wet spinning processes, the addition of larger quantities of 25 to 100%, based on the quantity by weight of polycarbonate, prove to be expedient, and the concentration of the polycarbonate solution should be between 14 and 23%, more especially 15.8 to 18.8%.

In order to guarantee the stability of the spinning solution, the additives preferably are admixed continuously, only immediately before the shaping of the solution.

Due to their increased crystallinity, the filaments produced by the process of the invention have improved resistance to solvents, improved temperature stability and a low sensitivity to temperature during the stretching, whereby in particular a better uniformity of the titre of the stretched filaments is obtained.

Example 1

Polycarbonate of the intrinsic viscosity $[\eta]=0.85$, prepared from di-(4-hydroxy phenyl)-2,2-propane and phosgene, is dissolved in methylene chloride to a 22% solution, forced through a filter press and supplied to a mixing member. A mixture of diethyl carbonate and methylene chloride is also injected into this mixing member in such a ratio and in such a quantity that, on leaving the mixing member, there is produced a 17% polycarbonate solution with a diethyl carbonate content of 30%, based on polycarbonate.

The solution thus thoroughly mixed with the added component is immediately forced through a 25-aperture spinneret with an aperture diameter of 0.09 mm. into a heated shaft, which is blown with heated air at the spinneret. The filaments are drawn off by way of roller systems and wound. The filaments stretched above the coagulation temperature in the ratio 1:4.5 have the following properties:

| | |
|---|---|
| Titre, den. | 80 |
| Strength, g./den. | 2.85 |
| Elongation at break, percent | 24 |
| Filament uniformity, percent mass fluctuation | 3 |
| X-ray interference width | 1.20 |
| Density | 1.2190 |

Example 2

The polycarbonate solution prepared according to Example 1 with an addition of diethyl carbonate is cast on a drum to form a film and dried for 5 minutes in an air stream at a temperature of 155° C. The film thus produced, after being stretched, has a strength of 28.5 kg./mm.² and an elongation at break of 23%. The X-ray interference width is 1.00 with a density of 1.2350.

We claim:
1. In the process of producing shaped articles by shaping a linear polycarbonate of di-(4-hydroxy phenyl)-2,2-propane from its solution, the improvement which comprises adding to said polycarbonate solution prior to the shaping thereof an organic carbonate of the formula

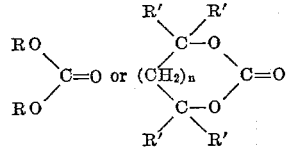

in which R is a member of the group consisting of alkyl, aryl and aralkyl and R' is a member of the group consisting of hydrogen and R, $n$ being an integer from 0 to 6, in an amount between 10 and 40% by weight, based on the weight of the dissolved polycarbonate.

2. In the process of producing shaped articles by shaping a linear polycarbonate of di-(4-hydroxy phenyl)-2,2-propane from its solution, the improvement which comprises adding to said polycarbonate solution prior to the shaping thereof an organic carbonate selected from the group consisting of diethyl carbonate, propylene carbonate and diphenyl carbonate in an amount between 10 and 40% by weight, based on the weight of the dissolved polycarbonate.

3. In the process of producing shaped articles by shaping a linear polycarbonate of di-(4-hydroxy phenyl)-2,2-propane from its solution, the improvement which comprises adding to said polycarbonate solution prior to the shaping thereof diethyl carbonate in an amount between 10 and 40% by weight, based on the weight of the dissolved polycarbonate.

4. In the process of producing shaped articles by shaping a linear polycarbonate of di-(4-hydroxy phenyl)-2,2-propane from its solution, the improvement which comprises adding to said polycarbonate solution prior to the shaping thereof propylene carbonate in an amount between 10 and 40% by weight, based on the weight of the dissolved polycarbonate.

5. In the process of producing shaped articles by shaping a linear polycarbonate of di-(4-hydroxy phenyl)-2,2-propane from its solution, the improvement which comprises adding to said polycarbonate solution prior to the shaping thereof diphenyl carbonate in an amount between 10 and 40% by weight, based on the weight of the dissolved polycarbonate.

References Cited by the Examiner
UNITED STATES PATENTS
3,021,340   2/1962   Anderson _____ 260—77.5

FOREIGN PATENTS
828,523   2/1960   Great Britain.

SAMUEL H. BLECH, *Primary Examiner.*